No. 614,521. Patented Nov. 22, 1898.
G. WERTZ.
SOFT TREAD HORSESHOE.
(Application filed Feb. 24, 1898.)

(No Model.)

Witnesses
R. K. Shepard
J. F. Riley

Inventor
George Wertz
By his Attorneys,
C. A. Snow & Co.

UNITED STATES PATENT OFFICE.

GEORGE WERTZ, OF PEORIA, ILLINOIS.

SOFT-TREAD HORSESHOE.

SPECIFICATION forming part of Letters Patent No. 614,521, dated November 22, 1898.

Application filed February 24, 1898. Serial No. 671,529. (No model.)

*To all whom it may concern:*

Be it known that I, GEORGE WERTZ, a citizen of the United States, residing at Peoria, in the county of Peoria and State of Illinois, have invented a new and useful Horseshoe, of which the following is a specification.

The invention relates to improvements in horseshoes.

The object of the present invention is to improve the construction of horseshoes and to provide a simple and inexpensive one adapted to act as a cushion and take the heavy jar off a horse and capable of preventing it from slipping and of leaving the frog free.

The invention consists in the construction and novel combination and arrangement of parts, as hereinafter fully described, illustrated in the accompanying drawings, and pointed out in the claims hereto appended.

Figure 1:
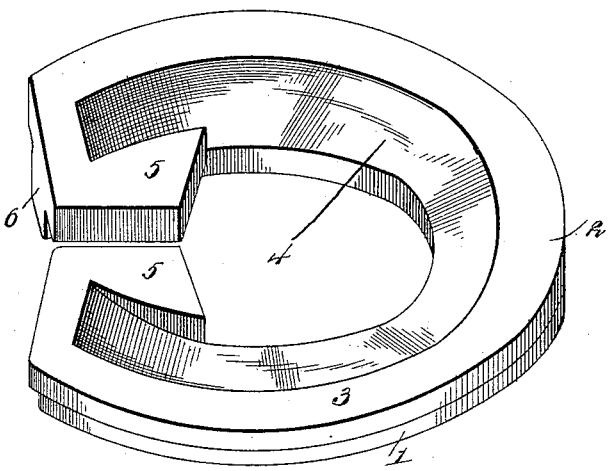
Figure 2:
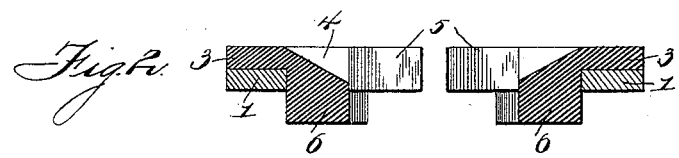
Figure 3:
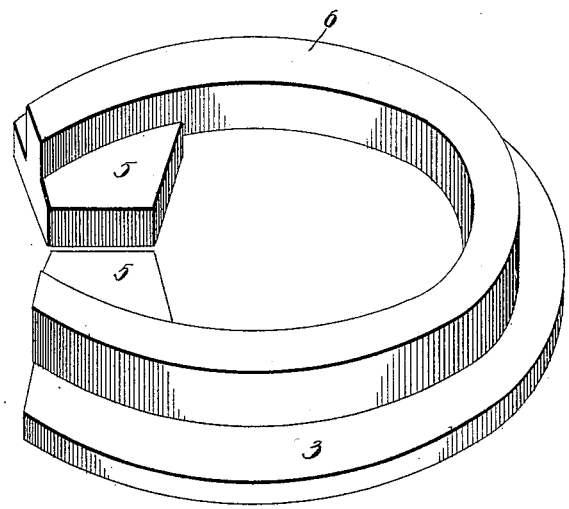
Figure 4:
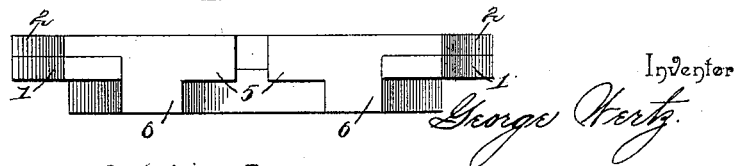

In the drawings, Figure 1 is a perspective view of a horseshoe constructed in accordance with this invention, showing the lower face thereof. Fig. 2 is a transverse sectional view. Fig. 3 is a perspective view of the elastic portion, showing the upper face thereof.

Like numerals of reference designate corresponding parts in all the figures of the drawings.

1 designates a metal horseshoe, upon which is mounted an elastic body portion 2, constructed of rubber or other suitable material and adapted to act as a cushion to relieve a horse of heavy jars and capable of leaving the frog of a hoof free and of producing a light sole-pressure. The elastic body portion, which is provided with a horizontal outwardly-extending flange 3, conforms to the configuration of the horseshoe in order to fit the hoof, and it is provided at its upper face with a horseshoe-shaped recess 4, arranged at the inner side of the body portion and adapted to leave the frog of a hoof free and give it a natural action. The ends of the recess 4 terminate a short distance from the ends of the body portion, which is provided at the inner side of the end portions of the recess with inwardly-extending enlargements 5, which are separated by a slight intervening space, as shown. The enlargements 5 form walls for the ends of the recesses, making grooves of the end portions of the same and supporting the hoof at the back thereof.

The horizontal flange 3, which extends over the upper face of the metal horseshoe, is interposed between the same and the hoof and is adapted to produce a light sole-pressure. The upper face of the flange 3 is flush with the upper faces of the enlargements 5 and the adjacent portion of the body 2.

The elastic body portion is provided with a depending tread 6, arranged at the inner edge of the metal horseshoe and conforming to the configuration of the same. The elastic tread 6, which projects beyond the metal horseshoe, cushions the hoof to relieve it of heavy jars and operates to prevent a horse from slipping on paved streets, frozen ground, and similar slippery surfaces.

The invention has the following advantages: The elastic body portion is simple and comparatively inexpensive in construction and is adapted to be readily applied to a hoof and a horseshoe, and it does not necessitate any alteration in the construction of the ordinary metal shoe. It gives the frog natural action and produces a light sole-pressure, it acts as a cushion and relieves an animal of heavy jars, and it prevents it from slipping. It also supports the sole and prevents the same from dropping down.

Changes in the form, proportion, and minor details of construction may be resorted to without departing from the spirit or sacrificing any of the advantages of this invention.

What I claim is—

1. A device of the class described, comprising an elastic body portion conforming to the configuration of a horseshoe depending below the same to form a cushion and provided in its upper face at its inner edge with a horseshoe-shaped recess 4, said elastic body portion being provided at its ends with enlargements located at the ends of the recess, forming side walls for the same and having their upper faces flush with the upper face of the body portion, substantially as described.

2. A device of the class described, comprising an elastic body portion provided at the inner edge of its upper face with a horseshoe-shaped recess and consisting of a horizontal flange arranged on the upper face of the shoe and interposed between the same and the hoof to afford a light sole-pressure, and a depending horseshoe-shaped tread arranged at the inner edge of the metal horseshoe and depending below the same to form a cushion and prevent slipping, substantially as described.

3. A device of the class described, comprising an elastic body portion provided at the inner edge of its upper face with a horseshoe-shaped recess 4 and consisting of a horizontal flange arranged on the upper face of the horseshoe and designed to be interposed between the same and the hoof, the depending tread arranged at the inner edge of the shoe and projecting beyond the same to form a cushion, and the inwardly-extending supporting portions 5 located at the back of the body portion and forming side walls for the horseshoe-shaped recess, said supporting portions 5 having their upper faces flush with the upper face of the body portion, substantially as described.

In testimony that I claim the foregoing as my own I have hereto affixed my signature in the presence of two witnesses.

GEORGE WERTZ.

Witnesses:
L. C. EARNEST,
R. G. HARDING.